Patented June 12, 1934

1,962,111

UNITED STATES PATENT OFFICE 1,962,111

STABLE TETRAZOMONOAZO COMPOUNDS AND THEIR PREPARATION

Heinrich Bamberger, Basel, Switzerland, assignor to firm Chemical Works formerly Sandoz, Basel, Switzerland No Drawing. Application January 2, 1931, Serial No. 506,328. In Germany January 7, 1930

6 Claims. (Cl. 260—69)

This invention relates to the preparation of new stable tetrazomonoazo compounds which are very useful for the production of fast black shades on textile fibres.

According to the present invention it has been found that it is possible to prepare stable dry tetrazomonoazo compounds by treating tetrazo solutions deriving from monoazo dyestuffs of the general formula

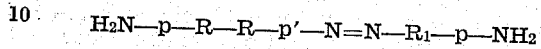

wherein R—R represents a substituted or not substituted p.p′-diamino-diaryl residue and $R_1$ a substituted benzene or naphthalene nucleus and wherein p means that the amino group contained in the aromatic nucleus $R_1$ must be in para-position to the diazo-group with suitable inorganic and organic substances, yielding with the tetrazomonoazo derivatives salts and double compounds that possess a smaller solubility as compared to that of their hydrochloric acid salts.

Substances which are suitable for carrying out the present process are for instance the heavy metal salts like zinc chloride, cadmium chloride, tin chloride, titanium chloride, or acids like boric acid, hydrofluoboric acid, hydrofluoric acid, fluorsilicic acid, fluorsulphonic acid and their double salts and also aryl sulphonic acids like naphthalene-di- and -tri-sulphonic acids, chlorobenzenesulphonic acids, nitrobenzenesulphonic acid, sulphanilic acids, naphthol-sulphonic acids and the like. By adding these compounds to the solutions of the tetrazotized monoazo dyestuffs cited above, the tetrazomonoazo compounds precipitate in form of their salts or double compounds and after filtration may be dried in vacuo, yielding stable products easily soluble in water with a yellow to brown coloration. On addition thereto of alkaline solutions of β-hydroxynaphthoic acid arylides, a precipitation of water-insoluble black dyestuffs occurs, which when produced on the fibre possess excellent properties of fastness.

The solutions containing the tetrazotized monoazo dyestuffs of the type cited are advantageously manufactured in the following way.

One molecule of a p-p′-diaminodiaryl compound is tetrazotized in the usual way and coupled with one molecule of an amine of the benzene or naphthalene series, capable of forming para-amino-azo-bodies.

The thus obtained diazomonoazo compound is then further diazotized and thereupon precipitated from its solution by addition of a suitable quantity of the above named substances. It is also possible to start from the p-aminodiaryl-p′-azoaryl-p-amino compounds prepared as described in the British specification No. 275,147, tetrazotize the same in the usual way and precipitate the obtained tetrazo compound from its solution by means of the substances cited above. In each case the precipitation gives good yields, even from very dilute solutions, which are necessarily obtained by working under most rational conditions, and allows, therefore, to carry out the present invention on a technical scale with a great success.

The present invention provides therefore a process for the preparation of dry stable tetrazomonoazo compounds which have hitherto never been prepared nor described and which possess a great interest for the production of fast black shades on textile fibres.

Applicant is aware, that solutions of tetrazomonoazo compounds of the type claimed in the present specification have often been produced in course of the manufacture of polyazo dyestuffs, but until now no attempts have been made in order to prepare them in a dry form. The possibility to produce them in a stable dry form could not have been foreseen and represents, therefore, an invention of a great technical value.

The new solid tetrazo-compounds may be mixed with partly or totally anhydrous salts and other suitable diluents, and make it possible to supply the user with tetrazomonoazo compounds, yielding particularly valuable tetrazomonoazo dyestuffs in a most concentrated form immediately ready for the use.

The following examples, without being limitative, illustrate the invention, the parts being by weight:

Example 1

36,8 parts of benzidine are tetrazotized in the usual way with 100 parts of hydrochloric acid of 30% strength and 27,6 parts of sodium nitrite. To the solution thus obtained are added under good stirring at a temperature of 0–5° C. 35,9 parts of α-naphthylamine hydrochloride, dissolved in about 1200 parts of water, and the solution stirred until the formation of the intermediate product has occurred. To the suspension of the intermediate product obtained are added 25 parts of hydrochloric acid of 30% strength, the solution is cooled down to 0° C. by addition of ice and a solution of 15 parts of sodium nitrite is introduced under the surface of the solution. After having stirred during 2–3 hours, the diazotization is finished and a nearly clear solution of the tetrazo compound is obtained.

The solution is then filtered in order to seprate impurities and the zinc chloride derivative of the tetrazo compound is precipitated in form of a brown crystalline precipitation by an addition thereto of a concentrated solution of 60 parts of zinc chloride and 100 parts of sodium chloride.

After a leave of several hours the precipitate is filtered off and dried in vacuo at a temperature of 45–50° C. The stable dark powder obtained is easily soluble in water with an orange, in concentrated sulphuric acid with a violet and in concentrated hydrochloric acid with a yellowish-brown coloration; on textile fibres impregnated with β-hydroxynaphthoic acid arylides it yields very fast black dyeings.

If instead of α-naphthylamine o-anisidine or p-cresidine are used, similar stable tetrazo compounds are obtained. They yield with β-hydroxynaphthoic acid arylides fast black shades of a bit reddish tone.

*Example 2*

By adding to the tetrazo compound solution obtained as described in Example 1, instead of zinc chloride, 100 parts of the sodium salt of naphthalene trisulphonic acid, the naphthalene trisulphonic acid salt of the tetrazo compound separates out in form of a yellowish-brown crystalline precipitation. On further addition of some sodium chloride to the solution the precipitation can be completed. The precipitate is then filtered off and dried in vacuo at a temperature of 40–50° C.

By replacing the benzidine used in these examples by equivalent quantities of tolidine or dianisidine and the α-naphthylamine by other amines of the benzene or naphthalene series, such as 1 amino-2-ethoxynaphthalene or p-cresidine, the method of preparation of stable tetrazo compounds remains the same.

*Example 3*

To the tetrazo compound prepared in the usual way from 48,8 parts of dianisidine, 100 parts of hydrochloric acid of 30% strength and 27,6 parts of sodium nitrite is added a slightly acid solution of 27,4 parts of 4-amino-3-methoxy-6-methylbenzene in about 1000 parts of water dissolved under addition of hydrochloric acid, and the solution thus obtained is stirred at a low temperature until the formation of the intermediary compound has taken place. After this has occurred, 25 parts of hydrochloric acid of 30% strength are added, the solution is cooled down to 0° C., and a solution of 15 parts of sodium nitrite is allowed to flow in under the surface of the solution. After stirring for 2–3 hours the diazotization is finished and a dark brown solution containing the tetrazo compound is obtained. After a filtration in order to separate the impurities the filtrate is treated with an excess of zinc chloride and sodium chloride, whereby the zinc chloride double salt of the tetrazo compound precipitates in form of a brown crystalline powder, which is filtered off and dried in vacuo at 45–50° C.

In the dry form it constitutes a stable brown powder which is easily soluble in water with a red-orange, in concentrated sulphuric acid with a red and in concentrated hydrochloric acid with a brown-red coloration. With β-hydroxynaphthoic acid arylides it yields water insoluble black dyestuffs, which, when produced on the fibre, possess excellent properties of fastness.

If, instead of dianisidine an equivalent quantity of o-tolidine is used, a dyestuff is obtained which yields reddish black shades.

*Example 4*

45,6 parts of mononitrobenzidine are dissolved in 1000 parts of hot water and 50 parts of hydrochloric acid of 30% strength and after cooling down to 0° C. the base is tetrazotized by adding thereto a solution of 27,6 parts of sodium nitrite. To the tetrazo solution thus obtained is slowly added at a temperature of 0–5° C. a solution of 35,9 parts of α-naphthylamine hydrochloride dissolved in about 1500 parts of water. The obtained mixture is so long stirred until any free α-naphthylamine has completely disappeared. After this has occurred, 25 parts of hydrochloric acid of 30% strength are added and a solution of 15 parts of sodium nitrite is allowed to flow in under the surface of the solution at a temperature of 0–5° C. under good stirring. After some hours the formation of the tetrazo compound is finished and a dark yellow solution is obtained.

After filtration in order to separate a small quantity of insoluble impurities, the filtrate is treated with an excess of zinc chloride and sodium chloride, whereby the nitrotetrazo compound is precipitated in form of a brown-yellow crystalline precipitate, which is pressed and dried in vacuo at 45–50° C. The black powder thus obtained possesses a good stability and is easily soluble in water with a yellow, in concentrated sulphuric acid with a blue and in concentrated hydrochloric acid with a yellowish-brown coloration. With β-hydroxynaphthoic acid arylides it yields black dyestuffs insoluble in water which, when produced on the fibre, possess excellent fastness properties.

What I claim is:

1. A process for the preparation of dry stable tetrazomonoazo compounds, consisting in treating aqueous solutions of tetrazomonoazo compounds of the general formula:

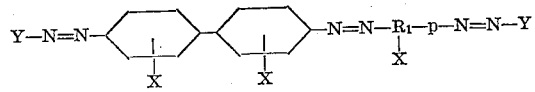

wherein $R_1$ represents an aromatic nucleus of the benzene or naphthalene series, X represents hydrogen, alkyl, alkoxy, nitro and halogen, Y represents a radical of a strong mineral acid, and $p$ indicates that both azo-groups linked to the aromatic nucleus $R_1$ are in para-position to one another, with a substance selected from the class consisting of heavy metal salts and naphthalene sulphonic acids.

2. A process for the preparation of dry stable tetrazomonoazo compounds, consisting in treating aqueous solutions of tetrazomonoazo compounds of the general formula

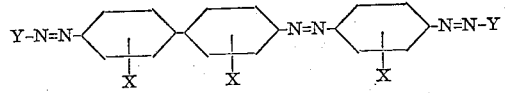

wherein X represents hydrogen, alkyl, alkoxy, nitro and halogen, and Y represents a radical of a strong mineral acid, with a substance selected from the class consisting of heavy metal salts and naphthalene sulphonic acids.

3. A process for the preparation of a dry stable tetrazomonoazo compound, consisting in treating an aqueous solution of the compound of the formula

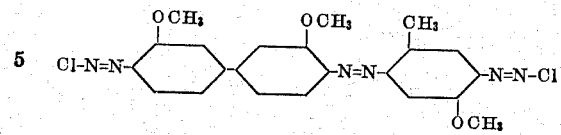

with a substance selected from the class consisting of heavy metal salts and naphthalene sulphonic acids.

4. A process for the preparation of a dry stable tetrazomonoazo compound, consisting in treating an aqueous solution of the compound of the formula

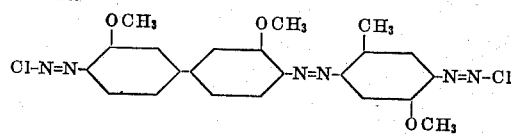

with zinc chloride.

5. The new dry stable tetrazomonoazo compounds, prepared as described in claim 1, which constitute in dry state brown to black powders easily soluble in water with yellow to brown coloration and in concentrated sulphuric acid with a red to violet and blue coloration and which yield with β-hydroxynaphthoic acid arylides water insoluble black dyestuffs which, when being produced on the textile fibre, possess excellent fastness properties.

6. The new dry stable tetrazomonoazo compound, prepared as described in claim 4, which constitutes in dry state a brown powder easily soluble in water with a red-orange and in concentrated sulphuric acid with a red coloration and which yields with a β-hydroxynaphthoic acid arylide a water insoluble black dyestuff, which, when being produced on the textile fibre, possesses excellent fastness properties.

HEINRICH BAMBERGER.